US 6,736,610 B2

(12) United States Patent  
Cifarelli

(10) Patent No.: US 6,736,610 B2
(45) Date of Patent: May 18, 2004

(54) BLOWER FAN, IN PARTICULAR FOR BLOWING APPARATUSES, AND BLOWING APPARATUS PROVIDED THEREOF

(75) Inventor: Roberto Cifarelli, Voghera (IT)

(73) Assignee: Cifarelli S.p.A., Voghera (IT)

( * ) Notice: Subject to any disclaimer, the term of this patent is extended or adjusted under 35 U.S.C. 154(b) by 0 days.

(21) Appl. No.: 10/127,239

(22) Filed: Apr. 22, 2002

(65) Prior Publication Data

US 2002/0176787 A1 Nov. 28, 2002

Related U.S. Application Data

(63) Continuation-in-part of application No. 10/058,702, filed on Jan. 28, 2002, which is a continuation-in-part of application No. 09/621,017, filed on Jul. 21, 2000, now abandoned.

(30) Foreign Application Priority Data

Jul. 30, 1999 (EP) ............................................. 99830498

(51) Int. Cl.⁷ ............................................. F04B 17/00
(52) U.S. Cl. .......................... 417/366; 415/98; 415/102; 415/202; 417/234
(58) Field of Search ................................ 417/366, 368, 417/234, 312; 415/98, 102, 202

(56) References Cited

U.S. PATENT DOCUMENTS

| | | | | |
|---|---|---|---|---|
| 2,465,625 A | * | 3/1949 | Aue | 415/99 |
| 3,199,772 A | * | 8/1965 | Leutzinger | 417/247 |
| 4,269,571 A | * | 5/1981 | Shikutani et al. | 417/234 |
| 4,470,753 A | | 9/1984 | Witzel | |
| 4,530,639 A | * | 7/1985 | Mowill | 415/98 |
| 4,644,606 A | | 2/1987 | Luerken et al. | |
| 4,927,323 A | * | 5/1990 | Kimberlin | 415/98 |
| 4,984,964 A | | 1/1991 | Callerio et al. | |
| 5,233,946 A | | 8/1993 | Yamami | |
| 5,322,413 A | | 6/1994 | Vescovini et al. | |
| 5,338,165 A | | 8/1994 | Brockner et al. | |
| 5,427,508 A | * | 6/1995 | Kapich | 417/374 |
| 5,746,577 A | | 5/1998 | Ito et al. | |
| 6,004,093 A | * | 12/1999 | Ishikawa | 415/98 |
| 6,059,541 A | | 5/2000 | Beckey et al. | |
| 6,077,033 A | | 6/2000 | Ishikawa | |
| 6,109,865 A | | 8/2000 | Ishikawa | |
| 6,413,056 B1 | * | 7/2002 | Chou | 417/366 |
| 2002/0067995 A1 | | 6/2002 | Cifarelli | |

FOREIGN PATENT DOCUMENTS

| | | |
|---|---|---|
| DE | 10 12 492 B | 7/1957 |
| EP | 1 074 178 A | 2/2001 |
| FR | 1 176 402 A | 4/1959 |
| GB | 161 464 | 4/1921 |

* cited by examiner

Primary Examiner—Justine R. Yu
Assistant Examiner—William H. Rodriguez
(74) Attorney, Agent, or Firm—Pearne & Gordon LLP

(57) ABSTRACT

A blower fan comprises a support element (13) presenting a first face (13a) and a second face (13b) mutually opposite to said first face (13a), the first and the second faces (13a, 13b) being respectively invested at least by a first and a second air flows (10, 11) coming from mutually opposite directions, a first blade series emerging at least from said second face (13b), and at least one air passage (13c) provided in the support element (13) and adapted to direct at least said first air flow (10) investing said first face (13a) at least partly through said support element (13).

35 Claims, 6 Drawing Sheets

BLOWER FAN, IN PARTICULAR FOR BLOWING APPARATUSES, AND BLOWING APPARATUS PROVIDED THEREOF

CROSS REFERENCE TO RELATED APPLICATION

This application is a continuation-in-part application of applicant's co-pending application entitled "MULTI-PURPOSE BLOWING APPARATUS" and filed on Jan. 28, 2002, which in turn is a continuation-in-part application of applicant's application Ser. No. 09/621,017, filed on Jul. 21, 2000 (now abandoned).

FIELD AND BACKGROUND OF THE INVENTION

The present invention relates to a blower fan suitable for use in blowing apparatuses such as haircombs, forced air circulation devices, multi-purpose blowing apparatuses for use in the agricultural field and the like.

The present invention also relates to a blowing apparatus, comprising an engine, a blower fan moved by the engine and adapted to generate a radial air flow, a volute header enclosing said blower fan and adapted to convey said radial flow at least partly towards use means.

It is known that in many applications, such as in the agricultural field, when cleaning of streets and pavements or grasslands is concerned, as well as for other similar application fields, portable blowing apparatus are used which are adapted to produce a strong air jet.

This air jet can be employed for spraying or atomizing anticryptogamic or manuring liquids held in small tanks associated with the blowing apparatus itself, or may constitute an air current of appropriate force for removal and displacement of leaves or other light material from road surfaces or grasslands.

The blowing apparatus generally comprises a two-stroke inner combustion engine moving a centrifugal blower fan adapted to generate a substantially radial delivery air flow. The blower fan is externally surrounded by a volute header adapted to convey the air flow at least partly towards the intended use means, which may consist for example of a flexible hose adapted to be gripped by an operator responsible for the apparatus.

In the known art, the blower fans bear a number of blades which, during suction, generate a single axial air flow converging towards the blades themselves, on the opposite side with respect to the engine.

Part of the delivery air flow is deviated from the provided main use and conveyed towards the engine sometimes contained at least partly in a casing, for cooling of the engine itself.

The known art briefly described above has some important drawbacks.

In fact, first of all, it is characterized by a non-optimal yield because the delivery air flow is not completely conveyed towards the use means provided for the blowing apparatus, but it is partly deviated for engine cooling. Part of the used energy is therefore employed for merely achieving a correct engine operation and the air flow really utilized has a smaller flow rate than that emitted from the wheel fan.

It should be also pointed out that engine cooling by means of an overpressure air flow is often of poor efficiency; in fact, due to flow resistance to which the air flow is submitted while passing through often tortuous passageways between the engine and casing, overpressure is reduced or eliminated, which will therefore stop or at all events decrease the air outflow. It is to be added that if the engine is not provided with a casing for improving cooling thereof, it produces a strong noise often higher than the limits that in some countries are allowed by regulations against sound pollution.

At all events, the blowing apparatus in accordance with the known art, even if it is provided with an engine-holding casing, often does not succeed in maintaining the engine noise within limits of acceptability because the cooling air flow, after impinging on the engine, flows out of the casing together with sound waves.

It is also to be noted that the air flow dedicated to engine cooling, heated by heat exchange with said engine, forms a troublesome hot air mass often directed towards the operator or other people near him/her.

Apart from what just stated for the known blowing apparatuses, it should also be pointed out that known types of blower fans are subject to important drawbacks.

In fact, it should be firstly recognized that the blower fans having a single axial-suction flow are asymmetric from a mechanical and hydraulic point of view; therefore they can be easily submitted to vibrations, giving rise to a further noise source.

Beside this, it is to be noted that the known architectures of blower fans are not optimized in terms of noise reduction (which is substantially generated by extensive turbulent flow phenomena throughout the volume existing between the blades).

At the same time, the traditional blower fans are designed to ensure a very precisely established air flow, which is taken from a predetermined suction port (having a correspondent passage area). If such passage area is partially choked, for example by dirt or solid bodies such leafs, papers or whatever else, the known blower fans' efficiency is strongly affected, and consequently the air flow produced by the same blower fans decreases dramatically.

SUMMARY OF THE INVENTION

Under this situation, the technical task underlying the present invention is to conceive a multi-purpose blowing apparatus capable of substantially obviating the mentioned drawbacks.

Within the scope of this technical task, it is an important object of the invention to devise a blowing apparatus having a high yield and operating efficiency.

Another important object of the invention is to devise a blowing apparatus capable of improving efficiency in cooling the engine provided therein.

A further object is to provide a blowing apparatus emitting a reduced level of noise to the surrounding atmosphere.

A still further object of the invention is to devise a blowing apparatus capable of exclusively producing an air current to the outside, the direction of which is directly controlled by the operator without generating any troublesome hot air current directed against the operator or other people.

In the spirit of the present invention, another significant technical task consists in providing for a blower fan which is capable of greatly reducing the noise production, and at the same time which is capable of providing a great aerodynamic efficiency.

More in detail, the present invention aims at achieving a blower fan which may grant a high air flow rate in various operative conditions, even despite of a partial clogging of suction ports of the apparatus wherein the blower fan is operating.

Finally, the present invention is devoted to provide a blower fan which presents a well-balanced structure and which is easy to assemble, thus bringing advantages in reliability and productive economy.

The technical task mentioned and the objects specified are substantially achieved by a blower fan (and a blowing apparatus provided of such a blower fan) having the structural features retrievable in the alleged claims.

BRIEF DESCRIPTION OF THE DRAWINGS

Description of a preferred embodiment of a blower fan and of a blowing apparatus provided of such a blower fan in accordance with the invention are now given hereinafter, by way of non-limiting example, with reference to the accompanying drawings, in which.

Figure 1:
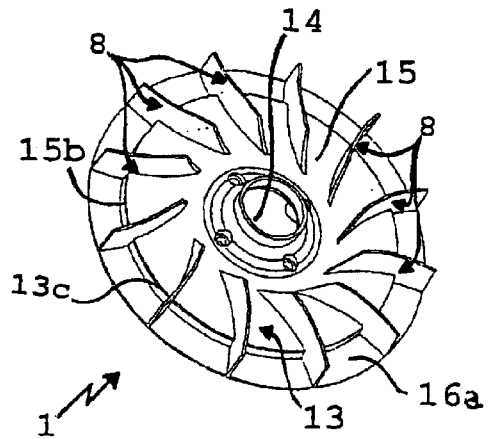
FIGS. 1 through 4 are perspective views of various embodiments of the blower fan in accordance with the invention.

DESCRIPTION OF THE PREFERRED EMBODIMENT with reference to the drawings, the blower fan in accordance with the invention is generally identified by reference numeral 1.

This blower fan, which can also be referred to as a "fan wheel" may be advantageously used in all those machines or apparatuses whose primary duty is to convey a fluid flow (of a gaseous or liquid substance) providing an adequate flow rate and a corresponding outlet pressure. For example, this blower fan 1 may be effectively used in devices like haircombs, vacuum cleaners, air conditioning plants, agricultural blowing/suction devices and other types of blowing apparatuses. It is also to be noted that the blower fan according to the present invention may operate on the fluid flow in a centrifugal or in a centripetal manner (that is, forcing the flow from its central portion to its perimetral portion or vice versa), according to the actual requirements.

The blower fan 1, as easily visible in the alleged drawings, comprises a support element 13, which in turn presents a first face 13a and a second face 13b mutually opposite.

The first face 13a and the second face 13b are respectively invested at least by a first and a second air flows (referenced with numerals 10 and 11 in the figures); these air flows are substantially oriented so as to come from mutually opposite directions, with respect to the support element 13.

In order to properly operate on the above cited air flows 10 and/or 11, the blower fan 1 according to the present invention comprises a first blade series emerging at least from one of the two faces 13a or 13b (for example, in figures from 5 to 12 a first blade series emerging from the second face 13b can be seen).

Advantageously, at least one air passage 13c is provided in the support element 13. Thanks to the air passage 13c, one of the two air flows can be directed through the support element and therefore can be subject to aerodynamic interactions with the first blade series.

In other words, the presence of the air passage 13c ensures that even the flow which impinges on a face of the support element 13 with no blades may be accelerated and/or pressurized by aerodynamic effects exerted by a single blade series, which lies on the other blower fan's face.

In FIGS. from 5 to 12, it can be seen that the first air flow 10 (which invests the first face 13a) is directed through the support element 13, via the air passage 13c, so as to interact with the first blade series.

According to a peculiar feature of the present invention, the air passage 13c is aerodynamically connected to the first blade series; in this way, the first blade series and the air passage 13c cooperatively define a radial delivery air flow 4, which substantially results from mixing and/or confluence of the first and second air flows 10 and/or 11.

Figure 7:
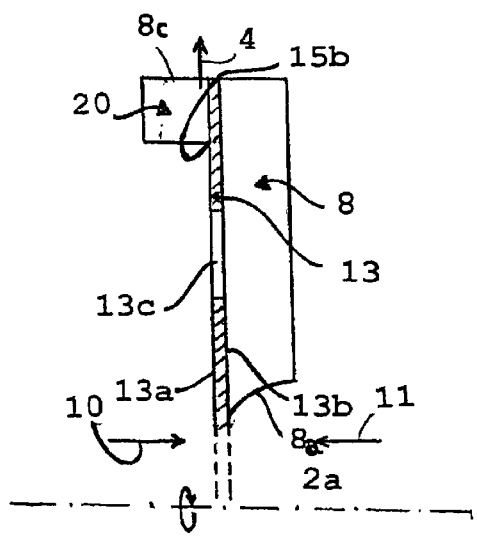

Conveniently, in a very simple embodiment of the present invention the air passage 13c may be a through cavity (or a series of radially spaced through holes) located in the support element 13 (see FIG. 7).

The first and the second air flows 10 and 11 can come from any direction, provided that they become substantially axial (or in other words, directed along the same ideal line in the space) and opposite to each other at least at a blower fan 1 entry.

Looking more closely at the support element 13, it can be seen that it may be formerly divided into a hub portion 14 (which is pivotally engageable about a rotation axis 2a) and a central portion 15 (which radially extends from the hub portion 14).

The central portion 15 presents a rest surface, which in turn defines, at least partly, the first and the second faces 13a and 13b; conveniently, the rest surface also defines a perimetral edge 15b radially delimiting the rest surface and developing according to a predetermined geometric shape (a circle or a polygon, according to the actual requirements).

Figure 11:
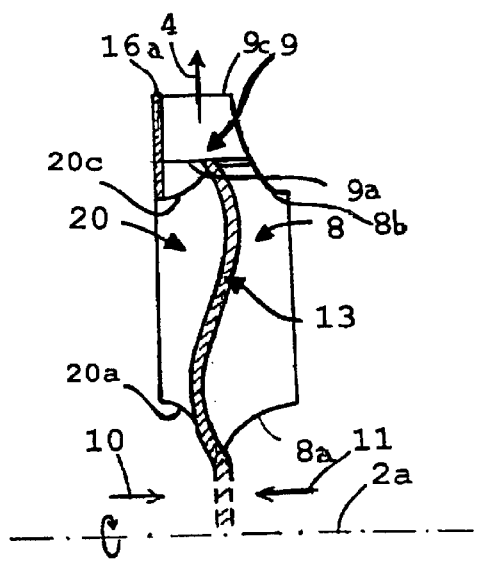
Figure 12:
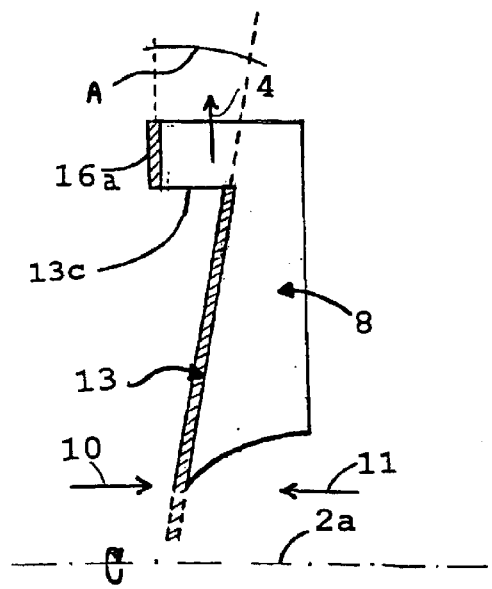

It is to be noted that the central portion 15 can be shaped in many ways, since its main functions are to provide adequate support for the blade series and to provide room for the air passage 13c. For example, in FIGS. from 5 to 10 a substantially planar central portion may be seen, but also a conical or concave/convex rest surface may be provided (as schematically shown in FIGS. 11 and 12).

Focusing the attention on the first blade series, it can be seen that it comprises first blades 8; such first blades 8 may be geometrically shaped in many ways, depending on the requirements of predicted air flow and/or desired turbulence level.

Figure 5:
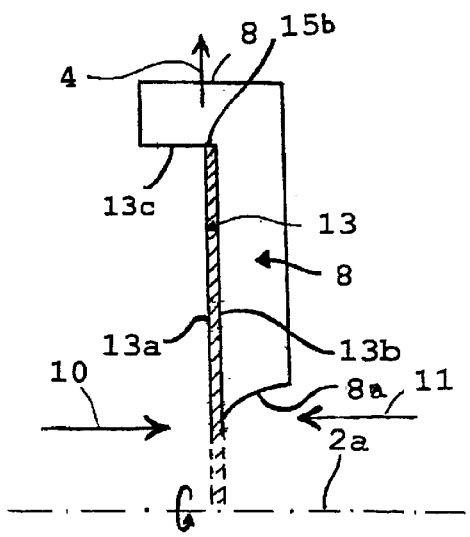
FIGS. 5 through 12 are views taken in partial section, along a plane containing the rotation axis of the blower fan in accordance with the present invention.
Figure 6:
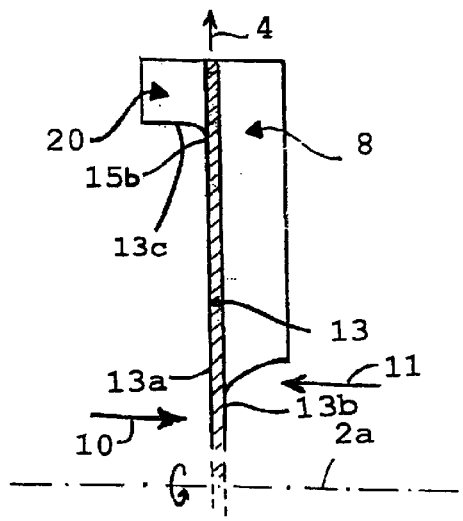
Figure 8:
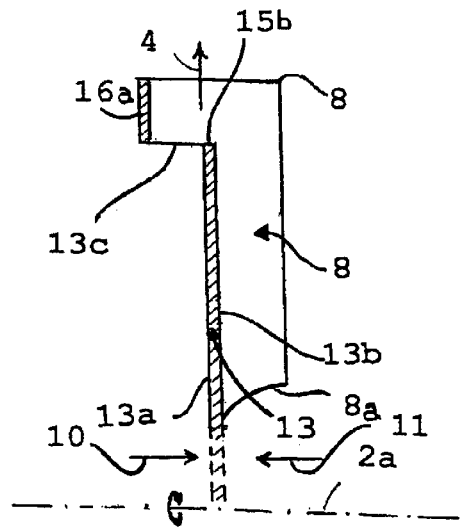
Figure 9:
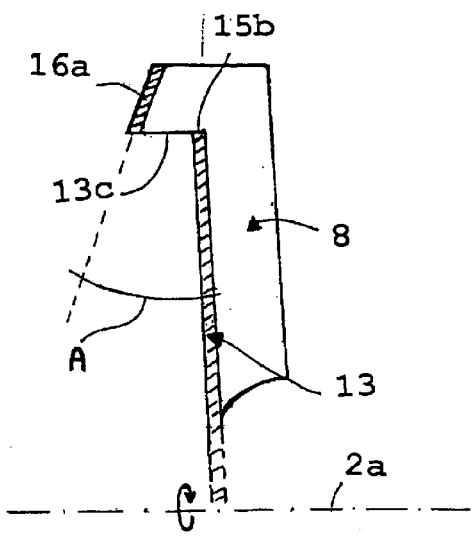

In a preferred embodiment, the first blades 8 have first root portions 8a located on the central portion 15 and first tip extensions 8c radially opposite to the respective first root portion 8a and extending beyond the perimetral edge 15b (see FIGS. 5, 8 and 9).

In this embodiment the first tip extensions 8c project both from said first face 13a and from said second face 13b (or in other words, the first tip extensions extend themselves in both the two semi-spaces ideally defined by the rest surface); as a consequence of this geometry, the air passage 13c is defined by an ideal surface defined by the perimetral edge 15b and by portions of said tip extensions 8c ideally projecting from the first face 13a (in the figures, this ideal surface can be visualized as the lateral surface of the ideal cylinder having the perimetral edge 15b as a base and the axial development of the first tip extensions departing from the first face 13a as an height).

For better directing of the radial delivery flow 4 and for limiting the size of turbulent structures generating in proximity of the perimetral edge 15b, the support element 13 may also comprise a main peripheral portion 16a: this main peripheral portion 16a is axially displaced, along the rotation axis 2a with respect to the central portion 15, whereby the air passage 13c can advantageously be defined by an ideal surface lying between said central portion 15 and said main peripheral portion 16a (for better understanding of this geometry, in FIGS. 1 to 4 the air passage 13c can be regarded as the lateral cylindrical surface essentially parallel to the rotation axis 2a and resting between the central portion 15 and the main peripheral portion 16a, which in turn are substantially perpendicular to the rotation axis 2a).

According to the present invention, the central portion 15 is substantially transverse to the rotation axis 2a, and the main peripheral portion 16a may be inclined by a predetermined first incidence angle "A" with respect to the central portion 15 itself. At the same time, the main peripheral portion 16a is axially displaced (along the rotation axis 2a) with respect to the central portion 15 by a predetermined first distance, which can for example be the height of the first tip extensions projecting in the semi-space defined by the first surface 13a.

According to this embodiment of the invention, the air passage 13c is defined by an ideal surface lying between said central portion 15 and the main peripheral portion 16a.

In the case that a main peripheral portion 16a is provided on the blower fan 1, the first blades 8 may have first root portions 8a located on the central portion 15 and first tip portions 8c, radially opposite to said first root portions 8a, located on the main peripheral portion 16a (see for example FIGS. 8, 9, 10 and 12).

Advantageously, and more in particularly independently on whether the main peripheral portion 16a is present or not, the blower fan 1 may also comprise a second blade series.

Figure 3:
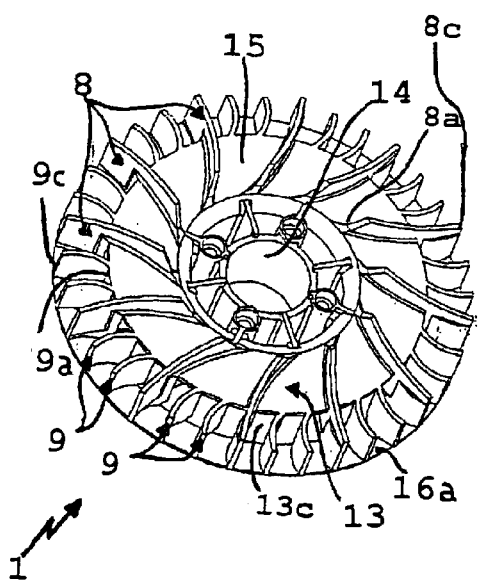
Figure 4:
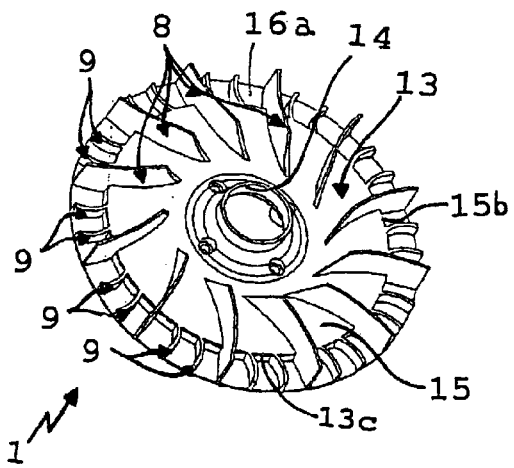

Such a second blade series comprises second blades 9, which in turn have second root portions 9a located in correspondence of the air passage 13c and second tip portions 9c, radially opposite to said second tip portions 9a, located on the main peripheral portion 16a (as shown for example in FIG. 3).

The second blade series operates on the air flows coming through the air passage 13c and have a double aerodynamic effect: firstly, they give to the air flow an extra amount of pressure, and secondly, they break off and further reduce the size of the turbulent structures.

Always in view of attaining great flow rates and reducing turbulence, the blower fan according to the present invention may also comprise an auxiliary peripheral portion 16b axially displaced along the rotation axis 2a (once again, with respect to the central portion 15 and along the rotation axis 2a) by a predetermined second distance therefrom.

The auxiliary peripheral portion 16b may be substantially opposite, with respect to the central portion 15, to the main peripheral portion 16a; in a similar manner, the auxiliary peripheral portion 16b may be inclined by a predetermined second incidence angle B with respect to the ideal plane defined by the central portion 15.

Figure 10:
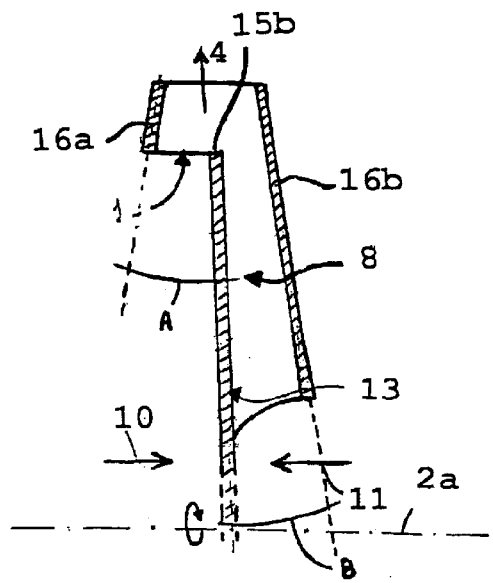

Beside this, it is to be noted that the geometric shape and extension of the auxiliary peripheral portion 16b may be chosen with great flexibility: for example, the auxiliary peripheral portion may be substantially identical to the main peripheral portion 16a, or alternatively it may be characterized by a larger extension (covering for example a large part of the first or the second faces of the support element, as shown in FIG. 10).

The main functions of the auxiliary peripheral portion 16b are essentially similar to the ones performed by the main peripheral portions (that is, reducing turbulence and properly orienting the radial air flow 4); beside this, it is to be noted that both the peripheral portions act as sound reflecting barriers, whereby noise waves generated by the air flows within the blower fan 1 are largely reflected in a confined space (which lies between the central portion 15 and the peripheral portions 16a and 16b) and is not allowed to reach the outside environment.

It is now to be observed that the embodiments of the blower fan 1 described up to now are essentially characterized by the fact that the first and/or the second) blade series substantially emerge from the same face of the support element 13 (in other words, all the blades 8 and/or 9 protrude from the same face of the support element, and do not have any part in direct contact with the opposite face of the support element 13).

At the same time, it should be noted that the first and the second blade series may present blades which can be geometrically identical or different, with respect to other blades belonging to the same series (or belonging to the other series, as well).

Anyhow, for further enhancement of the radial delivery flow 4 properties, a third blade series may be provided.

More in detail, the third blade series may be emerging from the same face from which at least the first blade series emerges, or advantageously, the third blade series may be emerging from the face opposite to the one from which the two aforementioned blade series emerge (in other words, the third blade series may be protruding in the same semi-space in which the first and/or the second blade series protrude, or alternatively, it may be protruding in the opposite semi-space, with respect to the support element 13).

According to the present invention, the third blade series may be geometrically different (for example, in terms of blade surface, blade profile and axial extension, or even in terms of blade root and tip positioning) from the first and/or the second blade series.

Figure 2:
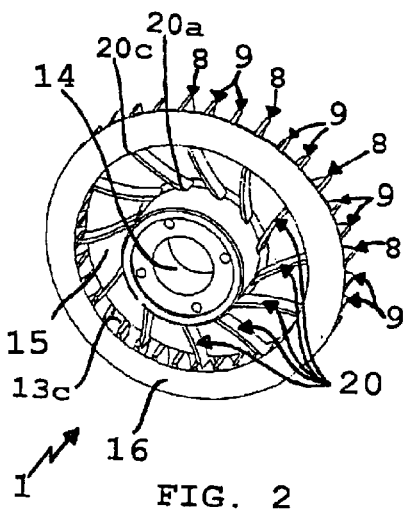

In the embodiment shown in FIG. 2, it is to be observed that the third blade series emerges from the second face 13b (and it is therefore ideally contained in the semi-space defined by the first face 13a) while the first and the second blade series emerge from the first face 13a (therefore belonging to the other semi-space).

More in detail, while the first or the second blade series comprise first blades 8 or second blades 9 having correspondent geometric characteristics (that is, first or second active surfaces respectively spaced by a first or second radial displacement), the third blade series comprise third blades 20 which present a third active surface and a third radial displacement; the just mentioned characteristics of the third blade series may advantageously be different from the ones of the first or second blade series, (for example, in terms of active surfaces, second radial displacements and so on).

Conveniently, the first and/or the second and/or the third blade series may be present in association with at least one air passage 13c, which in turn may be of the type described before; in this, case, the first and/or the second and/or the third blade series and the air passage 13c cooperatively define a radial delivery air flow 4, which substantially results from mixing and/or confluence of the air flows 10, 11 impinging on the two opposite faces 13a, 13b of the support element 13.

In a preferred embodiment of the present invention, the third blade series comprise third blades 20 having third root portions 20a, located in correspondence of the hub portion 14, and third tip portions 20c radially opposite to said third tip portions 20a, located in correspondence of said air passage 13c (see FIGS. 2 and 11).

Thanks to the just described architecture, the air flow impacting against one face is additionally pressurized and radially conveyed by the third blade series, and then is aspired through the air passage 13c, for subsequent mixing with the other air flow and further pressurization/radial convection by means of the first and/or the second blade series.

In accordance with the present invention, even in presence of the third blade series the support element 13 may be provided with all the structural parts described before: more in particular, a main and/or an auxiliary peripheral portions may be present.

The present invention is also related to a multipurpose blower apparatus, advantageously comprising a blower fan as described above.

Figure 13:
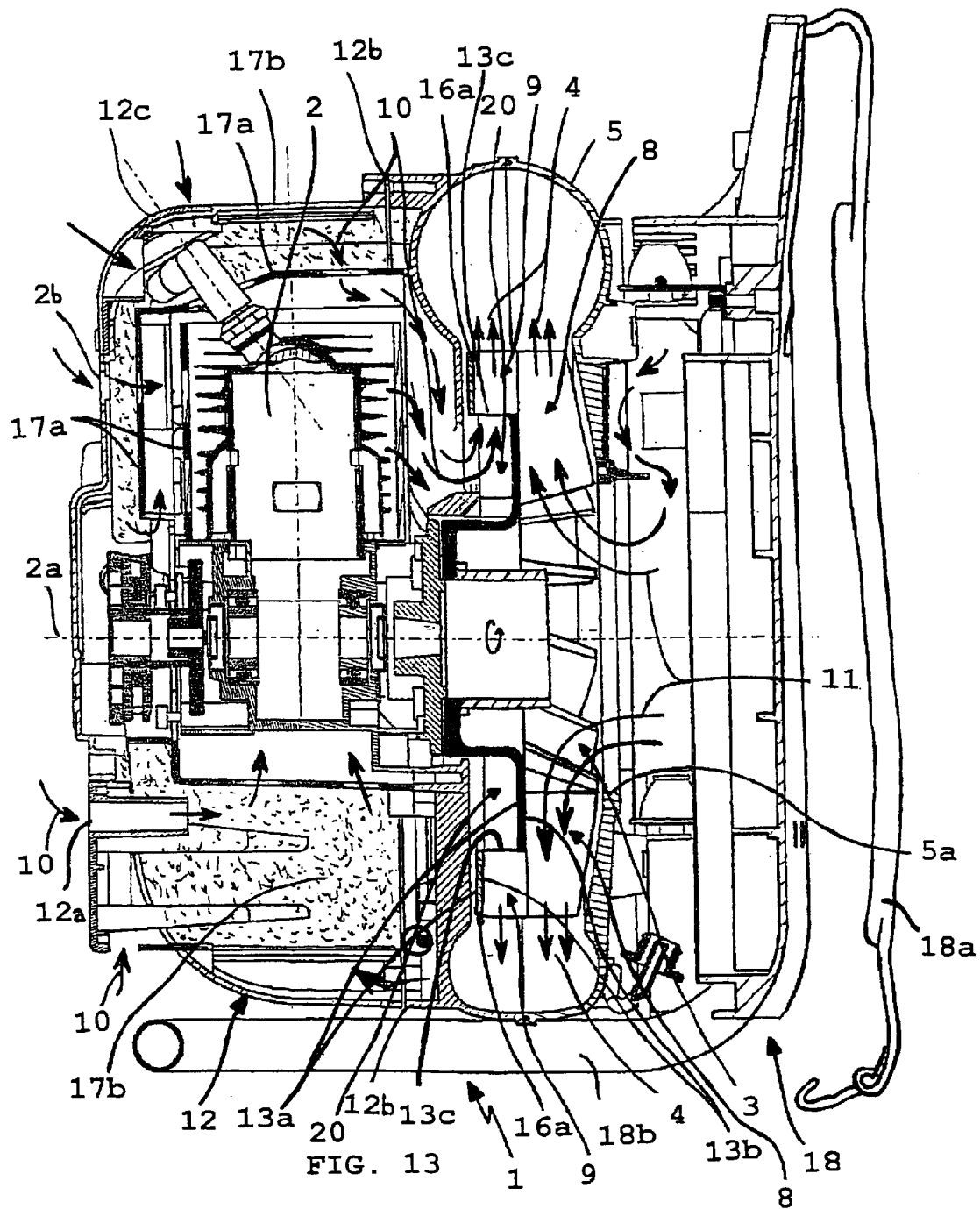
FIG. 13 is a section view, taken along a plane containing the rotation axis of the blower fan, of an air blowing apparatus provided with the fan in accordance with the present invention.
Figure 14:
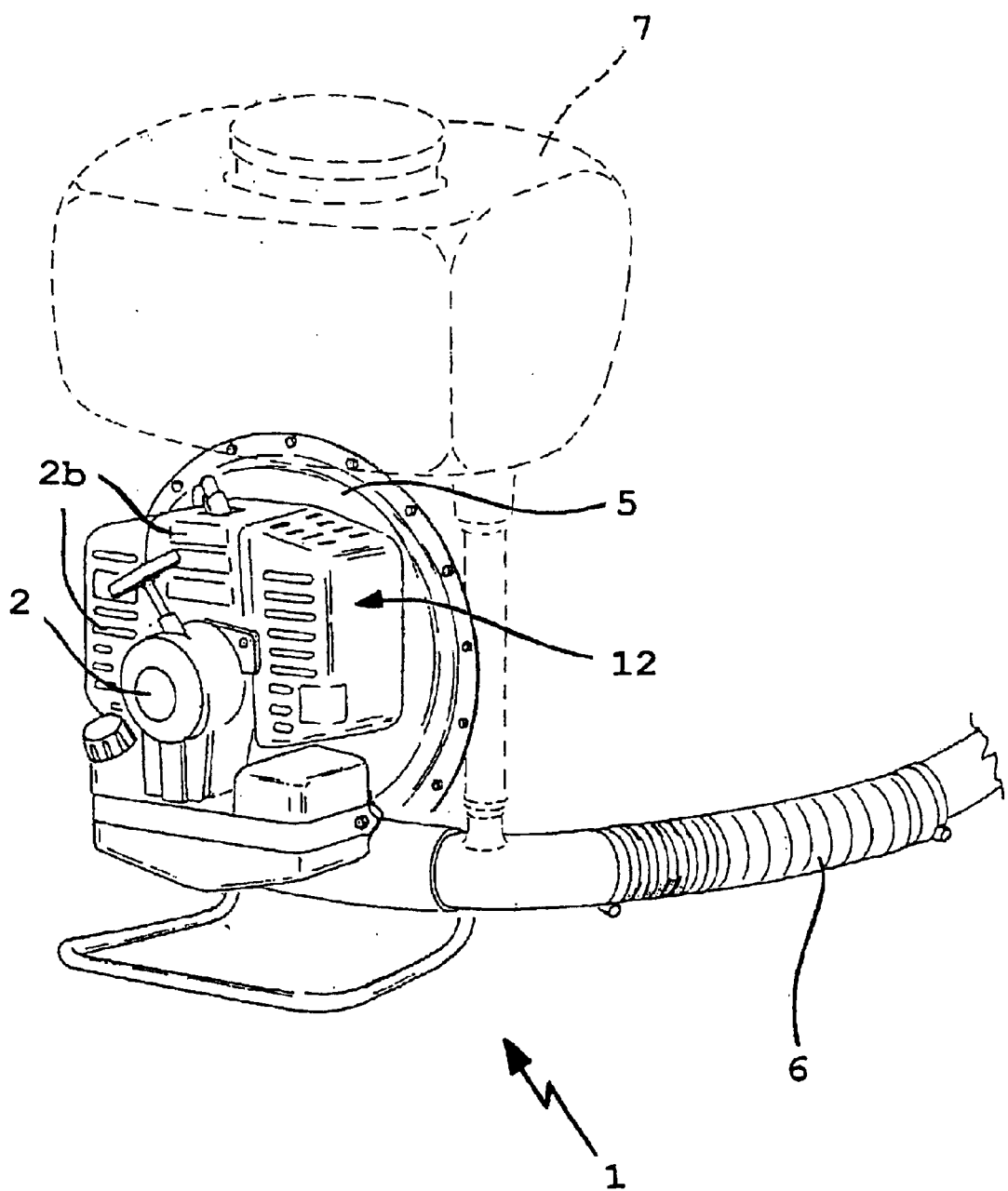
FIGS. 14 and 15 are schematic views of an air blowing apparatus in accordance with the present invention.
Figure 15:
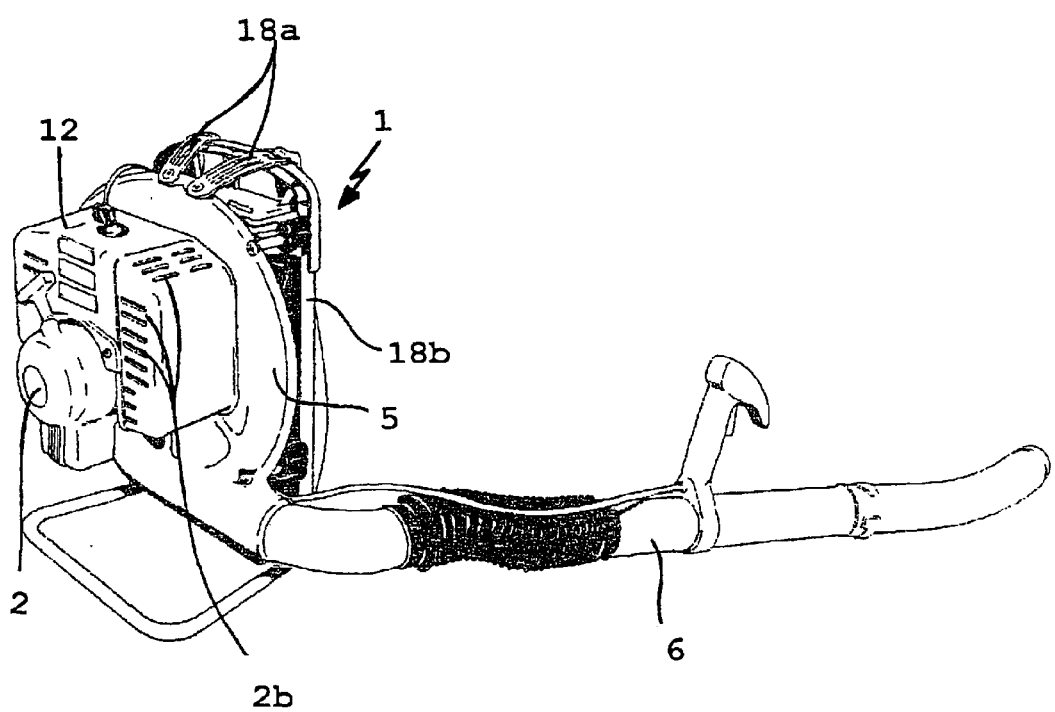

From a structural standpoint, this apparatus comprises an engine, which can conveniently be an internal combustion engine 2, provided with at least one cylinder and having cooling blades (see FIG. 13). It should be however clear that, according to the present invention, other engine types (e.g. electrical engines) may be fitted in the apparatus, depending on various requirements.

A driving shaft of the engine 2 moves a blower fan 1 (which can be of the centrifugal type) coupled therewith and capable of generating a radial delivery air flow 4.

The radial delivery air flow 4 is conveyed towards provided use means 6 by a volute header 5 externally surrounding the blower fan 1. In other words, the apparatus 1 according to the present invention may comprise differently shaped use means for blowing out the compressed air flow (that is, the radial delivery air flow 4), which are operatively associated at least with the blower fan 1 and are adapted to convey an exhaust air flow generated by the blower fan 1 itself.

The above cited use means may generally comprise a flexible hose 6, direction of which can be controlled by an operator.

Optionally, the cited use means may comprise a tank 7 for liquid injection in the airflow. This liquid, which can be atomized in the air flow, is housed in the tank 7 and is suitably admitted to the flexible hose 6 in operative conditions.

It is further to be pointed out that engine 2 is completely enclosed in a casing 12 provided with ventilation openings 12a to be passed through by at least the first air flow 10.

Casing 12 has a shell-like conformation and is connected at an attachment edge 12b thereof with the volute header 5. The ventilation openings 12a are all disposed in a bottom wall 12c of the casing substantially transverse to the engine axis 2a and they are positioned on the opposite side with respect to the attachment edge 12b. In particular, part of the ventilation openings 12a are disposed in a region of the bottom wall 12c substantially close to the cooling blades 2b of engine 2 so that the first air flow 10 during suction impinges on the engine surface (where a greater heat removal is required).

Finally, all the casing walls are particularly arranged for sound insulation to reduce spreading of noise to the surrounding atmosphere to the highest degree. At this purpose, in FIG. 1 it can be seen that the engine-holding casing 12 may comprise walls adapted to sound insulation.

From a structural point of view, the noise suppression capability is pursued by a predetermined number of internal walls 17a, which cooperatively define an acoustic labyrinth adapted to hamper the sound diffusion towards the external environment. The relative positioning of the internal walls 17a can be determined in order to optimize noise suppression: for example, as seen in FIG. 1 the internal walls 17a may encircle the engine 2a so that noise produced from the latter is reflected and substantially contained within the casing 12.

In order to enhance even more the noise suppression capability, the apparatus 1 may also comprise air-permeable acoustic filters 17b, which are associated to the engine-holding casing 12 and which are at least partly immersed in the first and/or second air flows 10, 11) (within the engine-holding casing 12 itself). Looking at FIG. 1, it can be noted that these acoustic filters 17b are placed between external walls and internal walls 17a of the engine-holding casing 12. Conveniently, the porosity and the physical properties of the acoustic filters 17b may be chosen in order to allow the required air flow; at the same time, according to the present invention, a great flexibility in positioning the acoustic filters 17b can be achieved: actually, provided that satisfactory first and/or second air flows 10 and/or 11 is/are granted, the acoustic filters 17b can be placed substantially anywhere in the apparatus 1.

For best ergonomy in use, the apparatus 1 according to the present invention may comprise means for back-holding 18; these means 18 are adapted to engage the apparatus 1 to an operator's back and generally comprise a predetermined number of suspenders 18a suitably connected to the apparatus 1. Whenever required, the back-holding means 18 may also comprise a framework 18b, which is connected to the apparatus 1 and bears the suspenders 18a.

The invention achieves important advantages.

First of all, the provision of multiple blade series, eventually coordinated with the peripheral portions, leads to a high pressurization rate and to a low turbulence: consequently, the mechanical power needed to move the blower fan can be minimized and great efficiency is achieved.

In particular, the suction efficiency of such a blower fan allows to maintain a satisfying air flow through the use means even when the air intakes (of the machine whereupon the blower fan is mounted) are partly clogged or choked. This high efficiency is also very useful whenever two or more air admission lines in the apparatus need to be provided.

It is also to be noted that the reduced turbulence and the screening effect given by the blades and by the various components of the support element contribute to generate a low amount of noise; in addition to this, it is to be considered that the increased efficiency of the blower fan implies that less mechanical power is needed to propel the fan itself, and this leads to a less noisy engine associated to the blower fan itself.

It will also be recognized that the centrifugal blower fan, having one or more mutually cooperating blade series gives and eventually having one or more peripheral portions, offers greater reliability and better rotational balancing.

Looking at the blowing apparatus, it should be pointed out that utilization of one of the sucking air flows for cooling the engine increases the apparatus yield to an important degree as compared with apparatuses of the known art, because all the air coming out of the blower fan is conveyed towards the intended use means.

It will be further recognized that also efficiency of the engine cooling is improved, since the centrifugal blower fan creates a vacuum within the wheel casing, which vacuum is adapted to ensure circulation of the air entering from the outside and reaching each region around the engine without stagnation regions being formed.

It should be noted that vacuum within the casing is not adversely affected by a possible reduction in the opening ports required for suction: because of this fact, noise from the apparatus is further limited, since noise being made already less strong due to air suction in the engine region and therefore to tendency of the sound waves to remain confined within the engine casing.

Due to the presence of cooling openings exclusively at the bottom region of the casing, the residual outgoing sound waves are oriented towards the side opposite to the operator's closest side.

Moreover, the operator is not impinged on by any hot air mass, because the sucking air flow heated by the engine, in addition to being mixed with the cold air of the second sucking flow, is at all events conveyed far away, through the flexible hose into which it flows.

What is claimed is:

1. A blower fan, in particular for blowing apparatuses, comprising:
 a support element (13) presenting a first face (13a) and a second face (13b) mutually opposite to said first face (13a), said first and second faces (13a, 13b) being respectively invested at least by a first and a second air flows (10, 11) coming from mutually opposite directions, said support element (13) being radially delimited at a predetermined maximum radial distance;
 a first blade series emerging from said first face (13a) or from said second face (13b);
 a second blade series emerging from said first face (13a) or from said second face (13b);
 at least one air passage (13c) provided in the support element (13) and defined at a perimetral edge (15b) located in the support element (13) at a radial distance inferior than said predetermined maximum radial distance, said at least one air passage (13c) being adapted to direct at least said first air flow (10) investing said first face (13a) at least partly through said support element (13); and
 a third blade series emerging from at least one of said first face (13a) and said second face (13b), said third blade series being geometrically different from at least one of said first blade series and said second blade series.

2. A fan as claimed in claim 1, wherein the first or the second blade series comprise first blades (8) or second blades (9) respectively presenting first or second active surfaces and being respectively spaced by a first or second radial displacement, said third blade series comprising third blades (20) presenting a third active surface and a third radial displacement which are different from said first or second active surfaces and from said first or second radial displacements.

3. The fan as claimed in claim 2, wherein said first blades (8) present first root portions (8a) located on the central portion (15) and tip extensions (8c) radially opposite to said first root portion (8a) and extending beyond said perimetral edge (15b), said tip extensions projecting both from said first face (13a) and from said second face (13b), said at least one air passage (13c) being defined by an ideal surface defined by said perimetral edge (15b) and by portions of said tip extensions (8c) ideally projecting from said first face (13a).

4. The fan as claimed in claim 2, wherein said support element (13) further comprises a main peripheral portion (16a) axially displaced along said rotation axis (2a) with respect to said central portion (15), said at least one air passage (13c) being defined by an ideal surface lying between said central portion (15) and said main peripheral portion (16a).

5. The fan as claimed in claim 2, wherein said central portion (15) is lying on a first plane transverse to the rotation axis (2a), said main peripheral portion (16a) lying on a second plane inclined by a predetermined first incidence angle (A) with respect to said first plane and axially displaced, along the rotation axis (2a), and being axially displaced, with respect to said first plane, by a predetermined first distance, said at least one air passage (13c) being defined by an ideal surface lying between said central portion (15) and said main peripheral portion (16a).

6. The fan as claimed in claim 2, wherein said first blade series comprise first blade (8) having first root portions (8a) located on the central portion (15) and first tip portions (8c) radially opposite to said first root portions (8a) and located on the main peripheral portion (16a).

7. The fan as claimed in claim 2, wherein said second blade series comprise second blades (9) having second root portions (9a) located in correspondence of said at least one air passage (13c) and second tip portions (9c) radially opposite to said second tip portions (9a) and located on the main peripheral portion (16a).

8. The fan as claimed in claim 2, wherein said third blade series comprise third blades (20) having third root portions (20a) located in correspondence of said hub portion (14) and third tip portions (20c) radially opposite to said third root portions (20a) and located in correspondence of said at least one air passage (13c).

9. The fan as claimed in claim 2, wherein the support body (13) further comprises an auxiliary peripheral portion (16b) substantially inclined by a predetermined second incidence angle (B) with respect to said central portion (15), said auxiliary peripheral portion (16b) being also axially displaced, along the rotation axis (2a), with respect to said central portion (15), by a predetermined second distance.

10. A multi-purpose blowing apparatus, in particular for use in the agricultural field and the like, comprising:
 an engine (2),
 a blower fan (1) moved by the engine (2) and adapted to generate a radial delivery air flow (4), and a volute header (5) surrounding said blower fan (1) and adapted to convey a radial delivery flow (4) at least partly towards a hose, wherein said blower fan is a blower fan as claimed in claim 1.

11. The apparatus as claimed in claim 10, wherein said engine (2) is disposed along the path of at least one of said first and second air flows (10, 11), so that at least said first air flow (10) defines an aspiration flow for engine cooling, generated by at least one of the corresponding first and second blades (8, 9) of said blower fan (1).

12. The apparatus as claimed in claim 10, wherein at least one of said first and second and third blades (8, 9, 20) generate said first air flow (10) for engine cooling having a flow rate adapted to complete cooling of the engine (2), so that said radial delivery air flow (4) can be completely conveyed from said volute header (5) to said provided use means.

13. The apparatus as claimed in claim 10, comprising an engine-holding casing (12) having ventilation openings (12a) to be passed through by said first air flow (10) for engine cooling.

14. The apparatus as claimed in claim 13, wherein said engine-holding casing (12) has a shell-like conformation and is connected at an attachment edge (12b) thereof with said volute header (5).

15. The apparatus as claimed in claim 13, wherein said ventilation openings (12a) are disposed in a bottom wall (12c) of said casing (12) substantially transverse to the axis (2a) of the engine (2) and positioned on the opposite side from said attachment edge (12b).

16. The apparatus as claimed in claim 15, wherein at least one of the first and the second and the third blades (8, 9, 20) during suction generate a second air flow (11) returned through at least one feeding opening (5a) defined by said volute header (5) and opposite to at least one of the first and the second and the third blades (8, 9, 20).

17. The apparatus as claimed in claim 16, wherein said feeding opening (5a) extends coaxially with the axis (2a) of said engine (2), at a region radially internal at least to said second blades (9).

18. The apparatus as claimed in claim 17, wherein said ventilation openings (12a) are placed at least partly in a region of said bottom wall (12c) of the casing (12) substantially disposed close to at least one of said first and second and said third blades (8, 9, 20).

19. The apparatus as claimed in claim 13, wherein said engine-holding casing (12) comprises walls adapted to sound insulation.

20. The apparatus as claimed in claim 13, wherein said engine-holding casing (12) comprises a predetermined number of internal walls (17a) cooperatively defining an acoustic labyrinth adapted to hamper the sound diffusion towards the external environment.

21. The apparatus as claimed in claim 13, wherein said engine-holding casing (12) comprises air-permeable acoustic filters (17b) at least partly immersed in at least one of the first and second air flows (10, 11) within the engine-holding casing (12).

22. The apparatus as claimed in claim 10, further comprising means for back-holding (18) adapted to engage the apparatus (1) to an operator's back, said means for back-holding (18) preferably comprising a predetermined number of suspenders (18a) and a framework (18b) connected to the apparatus (1) and bearing said suspenders (18a).

23. The fan as claimed in claim 1, wherein said at least one air passage (13c) comprises a series of radially spaced through holes.

24. The fan as claimed in claim 23, wherein said at least one air passage (13c) is aerodynamically connected to said first blade series, at least one of the first blade series and the second blade series and the third blade series and said at least one air passage (13c) cooperatively defining a radial delivery air flow (4), said radial delivery air flow (4) substantially resulting from mixing and/or confluence of first and second air flows (10, 11).

25. The fan as claimed in claim 24, wherein said first and second air flows (10, 11) are substantially axial and opposite to each other at least at a blower fan (1) entry.

26. The fan as claimed in claim 25, wherein said support element (13c) comprises:
  a hub portion (14) pivotally engageable about a rotation axis (2a); and
  a central portion (15) radially extending from said hub portion (14), said central portion (15) presenting a rest surface defining at least partly said first and said second faces (13a, 13b) and a perimetral edge (15b) radially delimiting said rest surface.

27. The fan as claimed in claim 26, wherein said first blade series comprises first blades (8) having first root portions (8a) located on the central portion (15) and tip extensions (8c) radially opposite to said first root portion (8a) and extending beyond said perimetral edge (15b), said tip extensions projecting both from said first face (13a) and from said second face (13b), said at least one air passage (13c) being defined by an ideal surface defined by said perimetral edge (15b) and by portions of said tip extensions (8c) ideally projecting from said first face (13a).

28. The fan as claimed in claim 26, wherein said support element (13) further comprises a main peripheral portion (16a) axially displaced along said rotation axis (2a) with respect to said central portion (15), said at least one air passage (13c) being defined by an ideal surface lying between said central portion (15) and said main peripheral portion (16a).

29. The fan as claimed in claim 28, wherein said central portion (15) is transverse to the rotation axis (2a), said main peripheral portion (16a) being inclined by a predetermined first incidence angle (A) with respect to said central portion (15) and axially displaced, along the rotation axis (2a) and being axially displaced therefrom by a predetermined first distance, said at least one air passage (13c) being defined by an ideal surface lying between said central portion (15) and said main peripheral portion (16a).

30. The fan as claimed in claim 28, wherein said first blade series comprises first blades (8) having first root portions (8a) located on the central portion (15) and said first tip portions (8c) radially opposite to said first root portions (8a) and located on the main peripheral portion (16a).

31. The fan as claimed in claim 28, further comprising a second blade series comprising second blades (9) having second root portions (9a) located in correspondence of said at least one air passage (13c) and second tip portions (9c) radially opposite to said second tip portions (9a) and located on the main peripheral portion (16a).

32. The fan as claimed in claim 28, wherein the support body (13) further comprises an auxiliary peripheral portion (16b) axially displaced along said rotation axis (2a) with respect to said central portion (15), said auxiliary peripheral portion (16b) being substantially opposite, with respect to the central portion (15), to the main peripheral portion (16a), said auxiliary peripheral portion (16b) being inclined by a predetermined second incidence angle (B) with respect to said first plane, said auxiliary peripheral portion (16b) being also axially displaced, along the rotation axis (2a), with respect to said first plane, by a predetermined second distance.

33. The fan as claimed in claim 1, wherein said at least one air passage (13c) provided in the support element (13) defines at least a through cavity in at least one of the first face (13a) and the second face (13b).

34. A blower fan, in particular for blowing apparatuses, comprising:
  a support element (13) presenting a first face (13a) and a second face (13b) mutually opposite to said first face (13a), said first and second faces (13a, 13b) being respectively invested at least by a first and a second air flows (10, 11) coming from mutually opposite directions, said support element (13) being radially delimited at a predetermined maximum radial distance;
  at least one air passage (13c) provided in the support element (13) and defined at a perimetral edge (15b) located in the support element (13) at a radial distance inferior than said predetermined maximum radial distance, said at least one air passage (13c) being adapted to direct at least said first air flow (10) investing said first face (13a) at least partly through said support element (13);

a first blade series emerging from said first face (13*a*) and comprising first blades (8) having first root portions (8*a*) located on the central portion (15) and tip extensions (8*c*) radially opposite to said first root portion (8*a*) and extending beyond said perimetral edge (15*b*), said tip extensions projecting both from said first face (13*a*) and from said second face (13*b*);

a second blade series emerging from said first face (13*a*) or from said second face (13*b*) and comprising second blades (9) having second root portions (9*a*) located in correspondence of said at least one air passage (13*c*) and second tip portions (9*c*) radially opposite to said second root portions (9*a*) and located on a peripheral portion (16*a*); and a third blade series emerging from said second face (13*b*) and comprising third blades (20) having third root portions (20*a*) located in correspondence of a hub portion (14) and third tip portions (20*c*) radially opposite to said third root portions (20*a*) and located in correspondence of said at least one air passage (13*c*).

35. A blower fan, in particular for blowing apparatuses, comprising:

a support element (13) presenting a first face (13*a*) and a second face (13*b*) mutually opposite to said first face (13*a*), said first and second faces (13*a*, 13*b*) being respectively invested at least by a first and a second air flows (10, 11) coming from mutually opposite directions, said support element (13) comprising a central portion (15) presenting a rest surface defining at least partly said first and said second faces (13*a*, 13*b*) and a perimetral edge (15*b*) located in the support element (13) at a predetermined radial distance inferior than a predetermined maximum radial distance;

a main peripheral portion (16*a*) axially displaced along said rotation axis (2*a*) and adjacent to said central portion (15) in correspondence of said perimetral edge (15*b*) and radially extending from said perimetral edge (15*b*) at a predetermined maximum radial distance;

at least one air passage (13*c*) provided in the support element (13) and of said perimetral edge (15*b*), said at least one air passage (13*c*) being adapted to direct at least said first air flow (10) investing said first face (13*a*) at least partly through said support element (13), said at least one air passage (13*c*) being defined by an ideal surface in correspondence of said perimetral edge (15*b*) and lying between said central portion (15) and said main peripheral portion (16*a*);

a first blade series emerging from said first face (13*a*) or from said second face (13*b*);

a second blade series emerging from said first face (13*a*) or from said second face (13*b*); and a third blade series emerging from at least one of said first face (13*a*) and said second face (13*b*), said third blade series being geometrically different from at least one of said first blade series and said second blade series.

* * * * *

UNITED STATES PATENT AND TRADEMARK OFFICE
CERTIFICATE OF CORRECTION

PATENT NO. : 6,736,610 B2  
DATED : May 18, 2004  
INVENTOR(S) : Roberto Cifarelli It is certified that error appears in the above-identified patent and that said Letters Patent is hereby corrected as shown below:

Title page,  
Item [30], Foreign Application Priority Data, please delete "99830498" and insert therefor -- 99830498.4 --.

Column 11,  
Line 18, please delete "17" and insert therefor -- 13 --.  
Line 51, after "of" please insert therefor -- said --.

Column 12,  
Line 25, please delete "comprises" and insert therefor -- comprise --.

Column 13,  
Line 13, please delete "on a" and insert therefor -- on a main --.

Signed and Sealed this

Twenty-eighth Day of September, 2004

JON W. DUDAS  
*Director of the United States Patent and Trademark Office*